United States Patent
Hultell et al.

(10) Patent No.: US 9,780,861 B2
(45) Date of Patent: Oct. 3, 2017

(54) METHODS AND DEVICES FOR CONFIGURING UPLINK TRANSMISSION DIVERSITY

(75) Inventors: Johan Hultell, Solna (SE); Paulson Angelo Vijay Silveris, Spånga (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 562 days.

(21) Appl. No.: 13/640,327

(22) PCT Filed: Sep. 6, 2012

(86) PCT No.: PCT/SE2012/050943
§ 371 (c)(1),
(2), (4) Date: Oct. 10, 2012

(87) PCT Pub. No.: WO2013/051990
PCT Pub. Date: Apr. 11, 2013

(65) Prior Publication Data
US 2013/0083776 A1 Apr. 4, 2013

Related U.S. Application Data

(60) Provisional application No. 61/543,008, filed on Oct. 4, 2011.

(51) Int. Cl.
*H04W 36/00* (2009.01)
*H04B 7/06* (2006.01)
*H04W 72/00* (2009.01)
*H04W 88/06* (2009.01)

(52) U.S. Cl.
CPC ........... *H04B 7/0689* (2013.01); *H04W 72/00* (2013.01); *H04W 88/06* (2013.01)

(58) Field of Classification Search
CPC ..... H04W 24/00; H04W 72/04; H04W 72/00; H04W 88/06
USPC .................................................. 370/252, 336
See application file for complete search history.

(56) References Cited

U.S. PATENT DOCUMENTS

2012/0207045 A1* 8/2012 Pelletier et al. ............... 370/252
2013/0176992 A1* 7/2013 Bharadwaj et al. .......... 370/336

FOREIGN PATENT DOCUMENTS

| RU | 2388181 C2 | 4/2010 |
|----|------------|--------|
| WO | 2010107699 A2 | 9/2010 |
| WO | 2010150662 A1 | 12/2010 |
| WO | 2011085187 A2 | 7/2011 |

OTHER PUBLICATIONS

3rd Generation Partnership Project; Technical Specification Group Radio Access Network; Enhanced uplink; Overall description; Stage 2 (Release 11); 3GPP TS 25.319 V11.0.0, Jun. 2011, pp. 66, 77-78.
QUALCOMM Incorporated, "Dynamic Control of UL CLTD via HS-SCCH orders," 3GPP TSG RAN WG1 Meeting #65, R1-111533, Barcelona, Spain, May 13, 2011, pp. 1-4.

(Continued)

*Primary Examiner* — Gbemileke J Onamuti
(74) *Attorney, Agent, or Firm* — Murphy, Bilak & Homiller, PLLC

(57) ABSTRACT

Methods and devices are described whereby the UE and the Node-B are configured to align the UL CLTD status of the UE and the NodeB during serving cell change involving a new Node-B.

26 Claims, 4 Drawing Sheets

(56) References Cited

OTHER PUBLICATIONS

InterDigital Communications, LLC, "Dynamic antenna selection via HS-SCCH order for UL CLTD," 3GPP TSG-RAN WG 1 Meeting #66, RI-112064, Athens, Greece, Aug. 26, 2011, pp. 1-3.
3rd Generation Partnership Project. "On the benefits of Uplink Closed Loop Transmit Diversity." 3GPP TSG RAN WG1 Meeting #62, R1-104737, Aug. 23-27, 2010, pp. 1-17, Madrid, Spain.
3rd Generation Partnership Project. "PCI confusion during the RRC connection re-establishment procedure." 3GPP TSG-RAN WG2 #67bis, R2-095589, Oct. 12-16, 2009, pp. 1-2, Miyazaki, Japan.
Johnson, Chris, "Radio Access Networks for UMTS Principles and Practice", Chapter 6.10 Mobility, Nokia Siemens Networks, UK, John Wiley & Sons, Ltd., 2008, 23 pages.
3GPP, "3GPP TS 25.212 V10.1.0 (Dec. 2010)", 3rd Generation Partnership Project; Technical Specification Group Radio Access Network; Multiplexing and channel coding (FDD) (Release 10), Dec. 2010, pp. 1-115.
3GPP, "3GPP TS 25.331 V10.3.0 (Mar. 2011)", 3rd Generation Partnership Project; Technical Specification Group Radio Access Network; Radio Resource Control (RRC): Protocol specification (Release 10), Mar. 2011, pp. 1-1863.
3GPP, "3GPP TS 25.331 V10.5.0 (Sep. 2011)", 3rd Generation Partnership Project; Technical Specification Group Radio Access Network; Radio Resource Control (RRC): Protocol specification (Release 10), Sep. 2011, pp. 1-1882.
3GPP, "3GPP TS 25.331 V7.20.0 (Jun. 2011)", Jun. 2011, 1-39, 457-459.
3GPP, "3rd Generation Partnership Project; Technical Specification Group Radio Access Network; Radio Resource Control (RRC); Protocol specification (Release 10)", 3GPP TS 25.331 V10.0.0 (Jun. 2010), Jun. 2010, 1-44, 536-539, 865.
3GPP, "Introduction of Uplink Closed Loop Transmit Diversity for HSPA", 3GPP TSG-RAN 1 Meeting #66, R1-113526, Huawei, HiSilicon, Athens, Greece, Aug. 22-26, 2011, pp. 1-105.

\* cited by examiner

METHODS AND DEVICES FOR CONFIGURING UPLINK TRANSMISSION DIVERSITY

TECHNICAL FIELD

The present invention relates to methods and devices for handling ULTD; in particular Closed loop ULTD, in a cellular radio system.

BACKGROUND

Third Generation Partnership Project (3GPP) is currently specifying Closed-loop (CL) Uplink Transmit Diversity feature in Rel-11. Uplink transmit diversity (ULTD) schemes use more than one transmit antenna in the User Equipment (UE) to improve the quality of the uplink transmission. The closed-loop transmit diversity scheme typically requires the receiver to provide fast feedback information about the spatial channel to assist the transmitter in choosing a transmission format over multiple transmit antennas. The approach now considered by the 3GPP is that the network (the serving Node-B or the Node-B in the activate set pointed out by the Radio Network Controller (RNC) in case no serving cell is configured) decides the precoding vector that shall be used by the UE. A precoding vector includes transmission antenna weights for a set of antennas. The antenna weights are associated with a respective transmit antenna, see also 3GPP Technical Specification 25.212 Multiplexing and channel coding, and 3GPP Technical Specification 25.331 Radio Resource Control (RRC).

There are two UL TD precoding coding schemes 'Beamforming" and "Antenna switching". 3GPP has chosen the 'Beamforming' transmitter scheme for the UL CLTD feature. In beamforming a signal is transmitted from a number of transmit antennas simultaneously with appropriate weighting. Switched antenna diversity implies that one single antenna at a time is used for transmission. In other words switched antenna diversity implies use of a precoding vector with one transmission antenna weight equal to one, and all remaining transmission antenna weights equal to zero.

There are currently 5 different UL CLTD configuration modes supported by a UE and the NodeB. In the future there may be fewer or more different UL CLTD configuration modes. The switching between these modes can be done by dynamic control via Serving NodeB High Speed-Shared Control Channel (HS-SCCH) orders (in case the UE is configured with a serving NodeB). Note further that the switching between at least some of the modes, e.g. CLTD configuration 1 and CLTD configuration 5 can be achieved by synchronised configuration via RNC Radio resource Control (RRC) reconfiguration messages.

TABLE 1

UL CLTD configurations

| UL CLTD Configuration | Uplink Channels | | | | |
|---|---|---|---|---|---|
| | HS-DPCCH | DPCCH | E-DPCCH | E-DPDCH | S-DPCCH |
| 1 | | Primary Precoding Vector | | | Secondary Precoding Vector |
| 2 | | Physical Antenna 1 | | | Physical Antenna 2 |
| 3 | | Physical Antenna 2 | | | Physical Antenna 1 |
| 4 | | Physical Antenna 1 | | | De-activate |
| 5 | | Physical Antenna 2 | | | De-activate |

The dynamic activation/de-activation of UL CLTD is important as the transmission from more than two transmit antennas will not be beneficial in certain scenarios and NodeB can take control of the situation via HS-SCCH orders (using local information that the RNC may be unaware of).

There is a constant desire to improve the performance in cellular radio systems.

Hence, there exist a need for new methods and devices providing improved performance in cellular radio systems with UEs configurable for UL CTLD.

SUMMARY

It is an object of the present invention to provide improved methods and devices to address the problems as outlined above.

This object and others are obtained by the methods and devices as set out in the attached claims.

As has been recognized by the inventors, when a UE is configured with UL CLTD, the Node-B can change the CLTD mode that the UE is operating with by means of HS-SCCH orders. This dynamic switching of the CLTD mode is transparent to the RNC, i.e. the RNC does not know which of the five CLTD modes the UE is configured with when operating in CLTD.

One approach to address this would be that the UE remembers the CLTD whenever a RRC reconfiguration message from the RNC is received and the
  Old serving cell remains in the active set, and/or
  The new serving cell was in the active set prior to the reconfiguration.

This would correspond to the approach used for, e.g., dual-cell High Speed Uplink Packet Access (HSUPA).

As has been recognized by the inventors, if the UE always remembers the CLTD activation status (i.e. CLTD mode in the table above) based on the HS-SCCH orders received from the serving NodeB there would be a problem when the serving Node-B is changed based on the RRC reconfiguration message from RNC. This is because the serving cell change will result in a mismatch between the CLTD modes of the UE and the new serving Node-B is operating with. The new serving NodeB would in this case be forced to always send an HS-SCCH order to the UE to align the CLTD mode of the UE to that of the serving NodeB during serving cell change. Also, the radio channel condition experienced by the UE with the old serving cell and the new serving cell may be very different and remembering the CLTD mode used in the old serving cell may be negative for transmit diversity performance.

As has further been recognized by the inventors, another problem that can arise is that, if precoded pilot signals are used in CLTD and the precoding weights are not signaled to the NodeB (that is in control of generating PCI commands)

in the uplink by the UE, the precoding weights used by the UE would be unknown to the new serving Node-B upon serving cell change.

For all the reasons specified above there is a need to provide improved configuration methods and devices for UE and Node-B with respect to the UL CLTD activation status (i.e. the CLTD configuration in table 1). This is particularly advantageous when a UE is controlled simultaneously by the HS-SCCH orders and RRC reconfiguration message.

Thus, in accordance with embodiments described herein methods and devices are described whereby the UE and the Node-B are configured to align the UL CLTD status of the UE and the NodeB during serving cell change involving a new Node-B.

In accordance with one embodiment, when UL CLTD is configured in UE and the serving Node-B is changed due to a RRC reconfiguration procedure, the UE and the Node-B are configured to use a predetermined CLTD mode. This can typically be one of the five UL CLTD modes currently supported by UE This mode is in accordance with some embodiments set in the standard specification, whereby no signaling is required to determine the predetermined mode.

In accordance with another embodiment, when UL CLTD is configured in a UE and the serving Node-B is changed due to a RRC reconfiguration procedure, the precoding vector is aligned between UE and network, typically the NodeB.

In accordance with one embodiment a UE is configured with UL CLTD and the UE receives RRC reconfiguration message that indicates a serving cell change procedure. In response to the RRC reconfiguration, the UE sets the UL CLTD mode to a predetermined UL CLTD mode. The predetermined UL CLTD mode can be set in the standard to a default mode or can be signaled to the UE. The signaling can originate in the RNC and transmitted to the UE via a radio base station.

In accordance with one embodiment when a UE is configured with UL CLTD. The UE changes serving cell, wherein the new serving cell is associated with a NodeB. The NodeB to which the UE is changing is then set to a predetermined CLTD mode. The predetermined UL CLTD mode can be set in the standard to a default mode or can be signaled to the NodeB.

In accordance with one embodiment a UE is configured with UL CLTD using precoding with a Precoding Control Information PCI vector The UE receives a RRC reconfiguration message that indicates a serving cell change procedure. In response to the RRC reconfiguration, the UE sets the PCI vector to a predetermined precoding vector. The predetermined precoding vector can be set in the standard to a default vector or can be signaled to the UE.

In accordance with one embodiment a UE is configured with UL CLTD using precoding with a PCI vector. The UE changes serving cell, wherein the new serving cell is associated with a NodeB. The NodeB to which the UE is changing is set to use a predetermined precoding vector. The predetermined precoding vector can be set in the standard to a default vector or can be signaled to the NodeB.

The invention also extends to User Equipments (UE) and a radio base stations Node B arranged to perform the above methods. The UE and radio base station Node B can be provided with a controller/controller circuitry for performing the above methods. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawing, in which.

DETAILED DESCRIPTION

Figure 1:
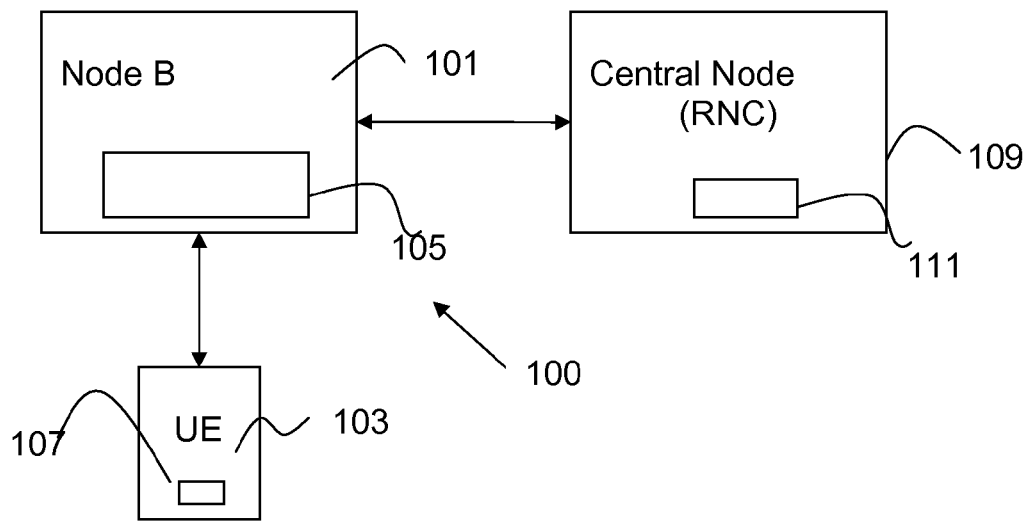
FIG. 1 is a view of a cellular radio system.

In FIG. 1 a general view of a cellular radio system 100 is depicted. The system 100 depicted in FIG. 1 is a UTRAN system. However it is also envisaged that the system can be another similar system. The system 100 comprises a number of base stations 101, whereof only one is shown for reasons of simplicity. The base station 101 can be connected to by user equipments in the figure represented by the UE 103 located in the area served by the base station 101. The UE 103 is enabled to transmit using UL CLTD. Further, the base stations 101 are controlled by a central node such as a Radio Network Controller (RNC) in the case of an UTRAN system. The base station, the central node and the user equipment further comprise controllers/controller circuitry 105, 107 and 111 for providing functionality associated with the respective entities. The cellular radio system 100 is further configured to support UL CLTD. The controllers 105, 107 and 111 can for example comprise suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

Figure 2:
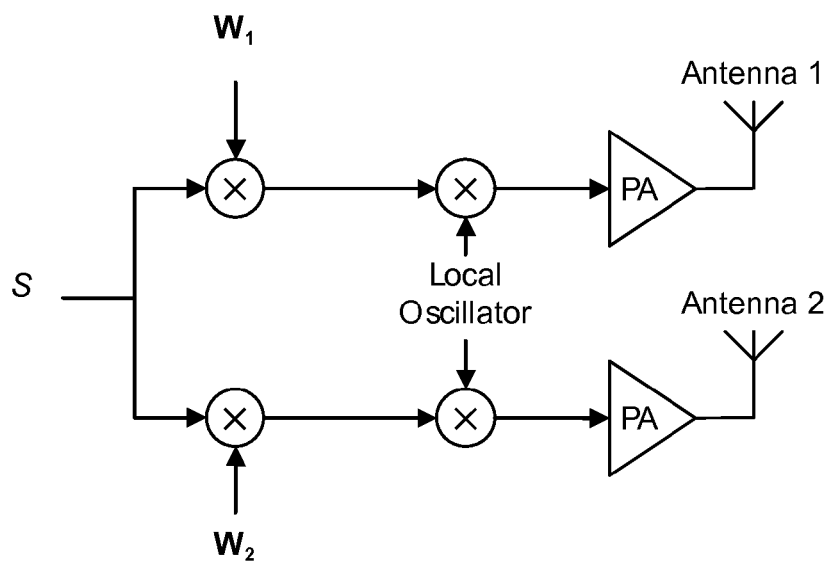
FIG. 2 is a view of a transmitter that can be used for transmission precoding

Further, FIG. 2 illustrates a transmit diversity transmitter that can be used in a UE to obtain precoding in UL CLTD. The exemplary transmitter in FIG. 2 uses 2 transmit antennas for transmission other numbers of antennas can of course be used. Thus, a signal to be transmitted S is fed to the two arms of the respective two antennas used. The signal S is multiplied be the respective weights W1 and W2 obtained from the precoding vector and further multiplied by the oscillation frequency. The respective signals are the amplified in respective power amplifiers (PA) and transmitted via the respective antennas (antenna 1 and antenna 2).

Aligning UL CLTD Mode During Serving Cell Change:

When the serving Node-B for a UE is changed based on a RRC reconfiguration message from RNC, this will result in a mismatch with respect to the CLTD modes of the UE and the new serving Node-B is operating with. To resolve this problem, the new serving NodeB is configured to send an HS-SCCH order to the UE to align (i.e. set the CLTD mode to the same for UE and the new serving cell) the CLTD mode of the UE during serving cell change.

Also, the radio channel condition experienced by the UE with the old serving cell and the new serving cell can be different and remembering the CLTD mode used in the old serving cell can negatively impact transmit diversity performance.

Figure 3:
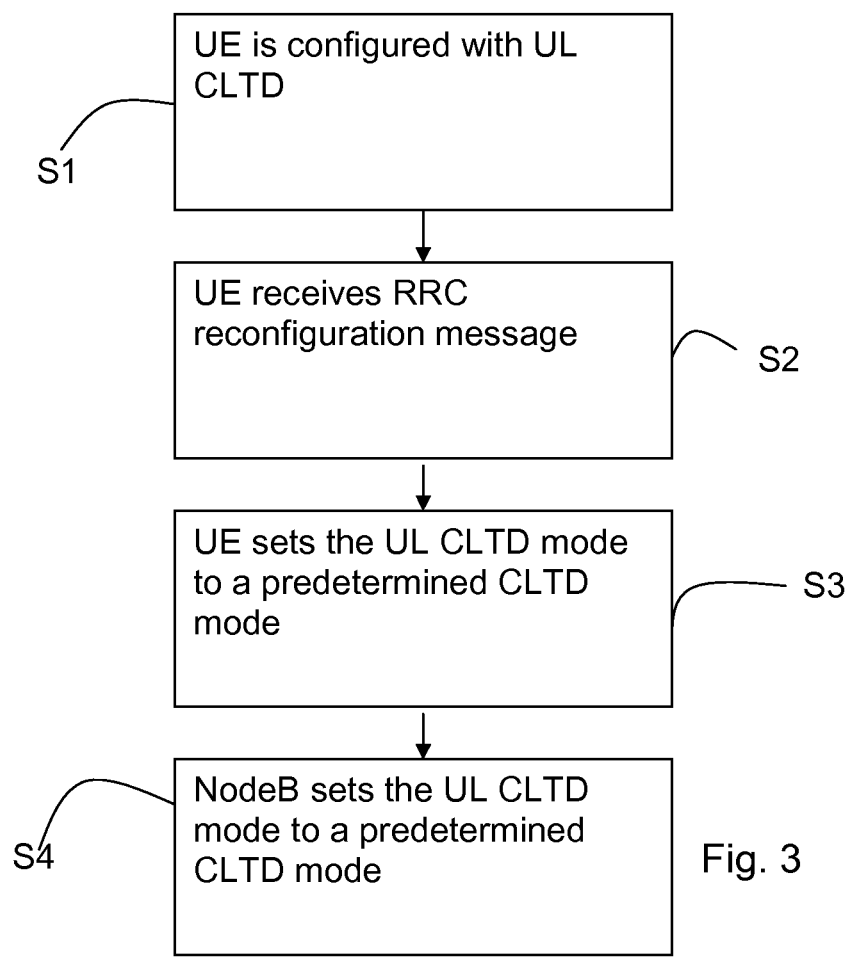
FIG. 3 is a flow chart depicting different steps performed when aligning ULTD in accordance with one embodiment.

In accordance with some embodiments the following steps can be performed to solve the CLTD mode mismatch between UE and Node which are depicted in FIG. 3:

First in a step S1 a UE is configured with UL CLTD. Next In a step S2 the UE receives RRC reconfiguration message that indicates a serving cell change procedure. Next, in a step S3, the UE sets the UL CLTD mode to a predetermined CLTD mode. Next, in a step S4, the new serving NodeB is also configured to the predetermined CLTD mode. The predetermined CLTD mode can be fixed in the standard. The fixed CLTD mode can typically be any one among the 5 known CLTD modes. In accordance with some embodiments the fixed CLTD mode can be hardcoded in UE and NodeB or signaled to NodeB and UE from the RNC.

Aligning the PCI Vector During Serving Cell Change:

During the serving cell change involving a new Node-B, it will not be possible for the new serving Node-B to know the precoding vector used by the UE, as the precoding vector was decided by the old serving Node-B.

Figure 4:
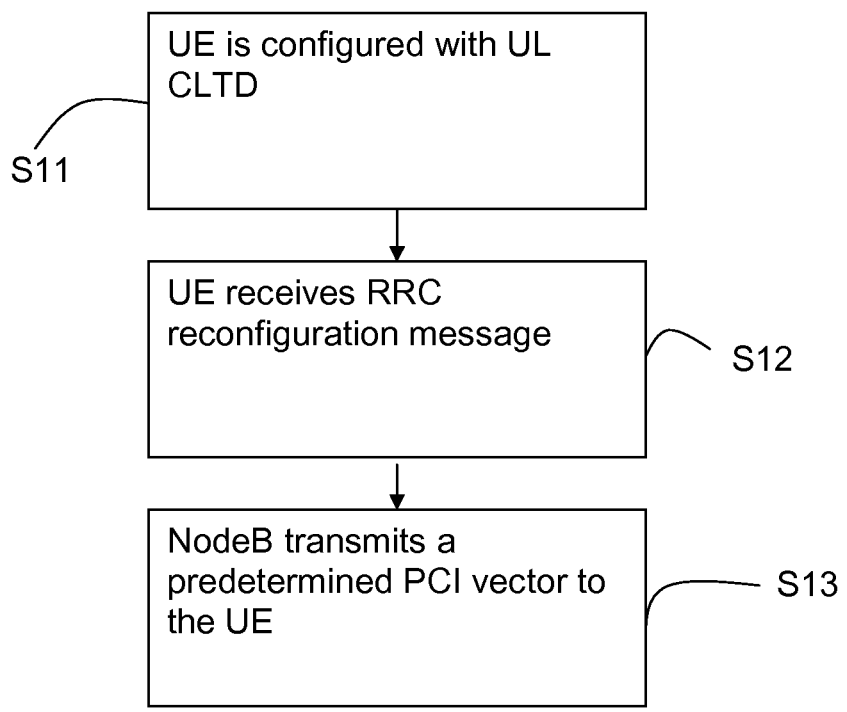
FIG. 4 is a flowchart depicting different steps performed when aligning PCI vector in accordance with one embodiment.

In accordance with some embodiments, the following steps illustrated in FIG. 4 can be performed whereby the new NodeB can align the Precoding Control Information (PCI) vector used by the UE to the PCI vector used by the new NodeB by transmitting the new PCI vector to the UE:

First in a step S11 a UE is configured with UL CLTD. Next, in a step S12 the UE receives a RRC reconfiguration message that indicates a serving cell change procedure. Thereupon, in a step S13, the new serving NodeB transmits a predetermined PCI vector to the UE (i.e. not based on the estimated radio channel between the UE and the new Node-B).

A drawback that can be encountered when transmitting a predetermined PCI-vector from a new serving NodeB is that when the quality of fractional precoding control indication channel (F-PCICH), a channel used to transmit PCI information form the NodeB to a UE, can not be guaranteed it the UE and Node-B still remain in different CLTD configurations (due to decoding errors by the UE).

In accordance with an alternative embodiment a method to overcome the drawback above is provided. In accordance with the alternative embodiment the UE is configured to always set the PCI to a default value, i.e. forget the PCI that it has received from the source Node-B during the serving cell change procedure and use a predetermined precoding vector. The pre-coding vector can be fixed and specified in the standard or it can be configurable via signaling, such as RRC signaling.

Figure 5:
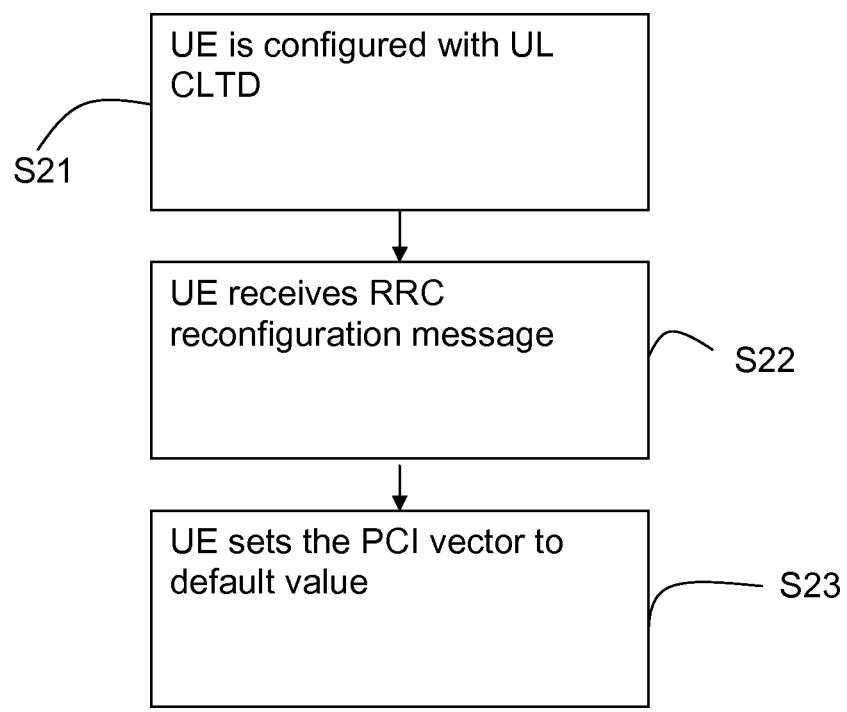
FIG. 5 is a flowchart depicting different steps in accordance with an alternative embodiment.

Thus, in accordance with some embodiments, the following steps illustrated in FIG. 5 can be performed whereby the new NodeB can align the Precoding Control Information (PCI) vector used by the UE to the PCI vector used by the new NodeB:

First in a step S21 a UE is configured with UL CLTD. Next, in a step S22 the UE receives a RRC reconfiguration message that indicates a serving cell change procedure. Thereupon, in a step S23, the UE is configured to set the PCI vector to a default value, i.e. forget the PCI that it has received from the source Node-B during the serving cell change procedure and use a predetermined precoding vector. The pre-coding vector can be fixed and specified in the standard or it can be configurable via signaling, such as RRC signaling.

Using the methods and devices as set out herein can enable the Node-B and the UE to operate with the same CLTD mode even during a handover to a new NodeB. Aside from increasing robustness, and reducing system complexity this will also improve system performance.

The invention claimed is:

1. A method of controlling an uplink (UL) Closed-loop Transmit Diversity (CLTD) mode in a User Equipment (UE) comprising:
    receiving a Radio Resource Control (RRC) reconfiguration message that indicates a serving cell change procedure; and
    setting the UL CLTD mode to a predetermined CLTD mode upon receipt of the RRC reconfiguration message, wherein the predetermined CLTD mode is one among a number of predefined UL CLTD modes.

2. The method according to claim 1, wherein the predetermined CLTD mode is specified by an associated communications standard.

3. The method according to claim 1, wherein the predetermined CLTD mode is hardcoded in the UE.

4. The method according to claim 1, wherein the predetermined CLTD mode is received via radio signaling.

5. A method of configuring a Precoding Control Information (PCI) vector in a User Equipment (UE) configured for uplink Closed-loop Transmit Diversity (CLTD), the method comprising:
    receiving a Radio Resource Control (RRC) reconfiguration message that indicates a serving cell change procedure; and
    setting the PCI vector to a predetermined precoding vector upon receipt of the RRC reconfiguration message that indicates a serving cell change procedure.

6. The method according to claim 5, wherein the predetermined precoding vector is specified by an associated communications standard.

7. The method according to claim 6, wherein the predetermined precoding vector is hardcoded in the UE.

8. The method according to claim 5, wherein the predetermined precoding vector is received via radio signaling.

9. The method according to claim 5, wherein the UE in the uplink CLTD mode shall use a PCI vector decided by the network.

10. The method according to claim 5, wherein:
    said receiving includes receiving a RRC reconfiguration message that causes a serving cell change procedure; and
    said setting is performed upon receipt of the RRC reconfiguration message that causes a serving cell change procedure.

11. The method according to claim 5, wherein the PCI vector of the UE is set to a default value upon receipt of the RRC reconfiguration message that indicates a serving cell change procedure in such manner that the PCI vector of the UE is aligned with a PCI vector used by the new serving cell.

12. The method according to claim 5, wherein said setting further includes the UE forgetting, during the serving cell change procedure, any PCI vector received from a source serving cell.

13. A method of controlling an uplink (UL) Closed-loop Transmit Diversity (CLTD) mode in a radio base station that is in communication with a User Equipment (UE), the method comprising:

determining when a Radio Resource Control (RRC) reconfiguration message that indicates a serving cell change procedure is transmitted to the UE; and setting the UL CLTD mode to a predetermined CLTD mode in response to said determining, wherein the predetermined CLTD mode is one among a number of predefined UL CLTD modes.

14. A User Equipment (UE) being configurable in an uplink Closed-loop Transmit Diversity (CLTD) mode, the UE comprising:

a receiver configured to receive a Radio Resource Control (RRC) reconfiguration message that indicates a serving cell change procedure; and controller circuitry configured to set the uplink CLTD mode to a predetermined CLTD mode in response to receipt of the RRC reconfiguration message.

15. The UE according to claim 14, wherein the predetermined CLTD mode is specified by an associated communications standard.

16. The UE according to claim 14, wherein the predetermined CLTD mode is hardcoded in the UE.

17. The UE according to claim 14, wherein the UE is configured to receive the predetermined CLTD mode via radio signaling.

18. A User Equipment (UE) configured to use a Precoding Control Information (PCI) vector in an uplink Closed-loop Transmit Diversity (CLTD) mode, and comprising:

a receiver configured to receive a Radio Resource Control (RRC) reconfiguration message that indicates a serving cell change procedure; and controller circuitry configured to set the PCI vector to a predetermined precoding vector in response to the RRC reconfiguration message that indicates a serving cell change procedure.

19. The UE according to claim 18, wherein the predetermined precoding vector is specified by an associated communications standard.

20. The UE according to claim 18, wherein the predetermined precoding vector is hardcoded in the UE.

21. The UE according to claim 18, wherein the predetermined precoding vector is received via radio signaling.

22. The UE according to claim 18, wherein the UE when in the uplink CLTD mode shall use a PCI vector decided by the network.

23. The UE according to claim 18, wherein:

the receiver is further configured to receive a RRC reconfiguration message that causes a serving cell change procedure; and the controller circuitry is further configured to set the PCI vector to a predetermined precoding vector upon receipt of the RRC reconfiguration message that causes a serving cell change procedure.

24. The UE according to claim 18, wherein the controller circuitry is further configured to set the PCI vector of the UE to a default value upon receipt of the RRC reconfiguration message that indicates a serving cell change procedure in such manner that the PCI vector of the UE is aligned with a PCI vector used by the new serving cell.

25. The UE according to claim 18, wherein the controller circuitry is further configured to forget, during the serving cell change procedure, any PCI vector received from a source serving cell.

26. A radio base station configured for communicating with a User Equipment (UE) using an uplink (UL) Closed-loop Transmit Diversity (CLTD) mode, the radio base station comprising controller circuitry configured to:

determine when a Radio Resource Control (RRC) reconfiguration message that indicates a serving cell change procedure is transmitted to the UE; and set the UL CLTD mode to a predetermined CLTD mode in response to determination, wherein the predetermined CLTD mode is one among a number of predefined UL CLTD modes.

* * * * *